US011459112B2

(12) United States Patent
LoPresto et al.

(10) Patent No.: US 11,459,112 B2

(45) Date of Patent: Oct. 4, 2022

(54) ACTIVE AIRCRAFT PROBE HEAT MONITOR AND METHOD OF USE

(71) Applicant: Rosemount Aerospace Inc., Burnsville, MN (US)

(72) Inventors: Vincent R. LoPresto, Eagan, MN (US); Weston D. C. Heuer, Maple Grove, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 439 days.

(21) Appl. No.: 16/517,237

(22) Filed: Jul. 19, 2019

(65) Prior Publication Data

US 2021/0016886 A1 Jan. 21, 2021

(51) Int. Cl.

*B64D 15/22* (2006.01)
*B64D 15/12* (2006.01)
*G01P 13/02* (2006.01)
*G01K 1/20* (2006.01)
*G01P 5/165* (2006.01)

(52) U.S. Cl.

CPC ............. *B64D 15/22* (2013.01); *B64D 15/12* (2013.01); *G01K 1/20* (2013.01); *G01P 5/165* (2013.01); *G01P 13/025* (2013.01)

(58) Field of Classification Search

CPC ......... B64D 15/12; B64D 15/20; B64D 15/22
See application file for complete search history.

(56) References Cited

U.S. PATENT DOCUMENTS 3,697,726 A * 10/1972 Geronime .............. G01K 13/08 219/469
4,458,137 A * 7/1984 Kirkpatrick ............. G01P 5/165 219/201

(Continued)

FOREIGN PATENT DOCUMENTS

EP 1422137 A1 5/2004
EP 2389314 A1 11/2011

(Continued)

OTHER PUBLICATIONS

Braga Viana Felipe Augusto et al., "Reliable Integration of Thermal Flow Sensors into Air Data Systems", 2018 VIII Brazilian Symposium on Computing Systems Engineering, IEEE, Nov. 5, 2018, pp. 99-105.

(Continued)

*Primary Examiner* — Joshua J Michener
*Assistant Examiner* — Michael B. Kreiner
(74) *Attorney, Agent, or Firm* — Locke Lord LLP; Scott D. Wofsy; Alicia J. Carroll

(57) ABSTRACT

A method including providing power to an aircraft probe anti-ice system, monitoring an actual power demand of the aircraft probe anti-ice system, monitoring an air data parameter and atmospheric conditions surrounding an aircraft and calculating an expected power demand of the aircraft probe anti-ice system based on the air data parameters and the atmospheric conditions, comparing the actual power demand of the aircraft probe anti-ice system to the expected power demand, and performing a corrective action if the actual power demand and the expected power demand are different by more than an acceptable amount.

12 Claims, 2 Drawing Sheets

(56) References Cited

U.S. PATENT DOCUMENTS 4,622,667 A * 11/1986 Yount ...................... G05B 9/03 714/E11.054
5,140,135 A * 8/1992 Freeman ................ B64D 15/20 219/492
6,370,450 B1 * 4/2002 Kromer .................. G01K 13/02 244/134 D
6,414,282 B1 * 7/2002 Ice ..................... G05D 23/1913 219/209
6,430,996 B1 * 8/2002 Anderson ............ G01K 13/028 73/170.26
6,654,685 B2 * 11/2003 McIntyre ............. G05D 1/0077 701/472
9,745,070 B2 8/2017 Brouwers et al.
10,018,580 B2 7/2018 Stothers et al.
10,132,824 B2 * 11/2018 Benning .............. G01K 13/028
10,435,161 B1 * 10/2019 LoPresto ................ B64D 45/00
10,716,171 B2 * 7/2020 Vadgaonkar .......... G01P 13/025
11,111,011 B2 * 9/2021 Bottasso ................ B64D 15/12
11,111,025 B2 * 9/2021 Zha ........................ B64D 15/12
2004/0024538 A1 * 2/2004 Severson ............... B64D 15/22 702/24
2004/0030417 A1 * 2/2004 Gribble .................... G05B 9/02 700/29
2004/0075567 A1 * 4/2004 Peck .................... H05B 1/0233 340/640
2009/0276133 A1 * 11/2009 May ........................ B64C 25/46 188/1.11 E
2010/0100260 A1 4/2010 McIntyre et al.
2010/0198546 A1 * 8/2010 Kamata .................... G01K 7/21 702/99
2010/0243811 A1 * 9/2010 Stothers ................. B64D 15/14 702/182
2011/0106331 A1 * 5/2011 Heuer .................... B64D 15/20 700/300
2013/0257391 A1 * 10/2013 Buenz ..................... H02M 1/42 323/207
2016/0161343 A1 * 6/2016 Smith .................... G01K 13/00 374/185
2017/0370960 A1 * 12/2017 Benning ................ B64D 15/20
2018/0111694 A1 * 4/2018 LoPresto ............ G01N 15/0227
2018/0319506 A1 * 11/2018 LoPresto ................ G01N 21/55
2019/0061958 A1 * 2/2019 Roman .................. G01B 11/30
2019/0143945 A1 5/2019 Webb et al.
2019/0176994 A1 * 6/2019 Burton .................... F03D 80/40
2020/0025632 A1 * 1/2020 Winter .................... G01P 5/165
2021/0190715 A1 * 6/2021 Francois .............. G01N 27/041

FOREIGN PATENT DOCUMENTS

EP 3264103 A1 1/2018
GB 2419673 5/2006
WO 2010/070273 6/2010

OTHER PUBLICATIONS

Extended European Search Report dated Jun. 9, 2020, issued during the prosecution of European Patent Application No. EP 19213983.0.
EP Communication pursuant to Article 94(3) EPC, dated Mar. 2, 2022, issued during the prosecution of European Patent Application No. EP 19213983.0, 8 pages.

* cited by examiner

ACTIVE AIRCRAFT PROBE HEAT MONITOR AND METHOD OF USE

BACKGROUND

Technological Field

The present disclosure relates to aircraft surface device heaters, and more particularly to probe heat monitors and a method of use.

Description of Related Art

Typical aircraft probe heat monitoring systems today look at the current draw through the heater circuit and can trigger when that current falls below a certain value. However, this method is only sufficient if an open circuit or a gross short occurs within the system and the heater circuit experiences a significant reduction in power. Due to the self-compensating nature of many aircraft probe heaters, the trigger level cannot be set at a current of sufficiently high accuracy to warn of conditions where current flow has only been slightly degraded. It is possible that current is flowing above the trigger level, but not enough current is flowing to maintain safe operation in severe icing conditions, especially if conditions suddenly change.

The conventional methods and systems have generally been considered satisfactory for their intended purpose, but with recent industry development, regulatory bodies have begun requiring a more reliable aircraft probe. The purpose of this disclosure is to ensure sufficient heating performance to maintain intended operation in the specific condition encountered at that time.

SUMMARY

A method includes providing power to an aircraft probe anti-ice system, monitoring an actual power demand of the aircraft probe anti-ice system, monitoring an air data parameter and atmospheric conditions surrounding an aircraft and calculating an expected power demand of the aircraft probe anti-ice system based on the air data parameters and the atmospheric conditions, comparing the actual power demand of the aircraft probe anti-ice system to the expected power demand, performing a corrective action if the actual power demand and the expected power demand are different by more than an acceptable amount. The air data parameters can include airspeed, total air temperature, altitude, angle of attack, and angle of sideslip. The atmospheric conditions can include temperature, ice water content and liquid water content. The anti-ice system can include a self-compensating heater.

The corrective actions can include changing the power supplied to the probe anti-ice system, removing the probe from the aircraft, removing the aircraft probe data from a voting arrangement, or notifying the pilots and/or aircraft systems that the subject aircraft probe data may not be reliable.

A system includes a device having a first surface configured to be exposed to airflow about an exterior of an aircraft, the device including a first self-compensating heater configured to heat the first surface, at least one current monitor configured to produce a first measurement value representing electrical current flow in and out of the first self-compensating heater, one or more processors, and computer-readable memory encoded with instructions that, when executed by the one or more processors, cause the system to: receive air data parameters and atmospheric conditions surrounding the aircraft, calculate an expected power demand of the self-compensating heater based on the air data parameters and the atmospheric conditions, compare the actual power demand of the self-compensating heater to the expected power demand, perform a corrective action if the actual power demand and the expected power demand are different by more than an acceptable amount.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
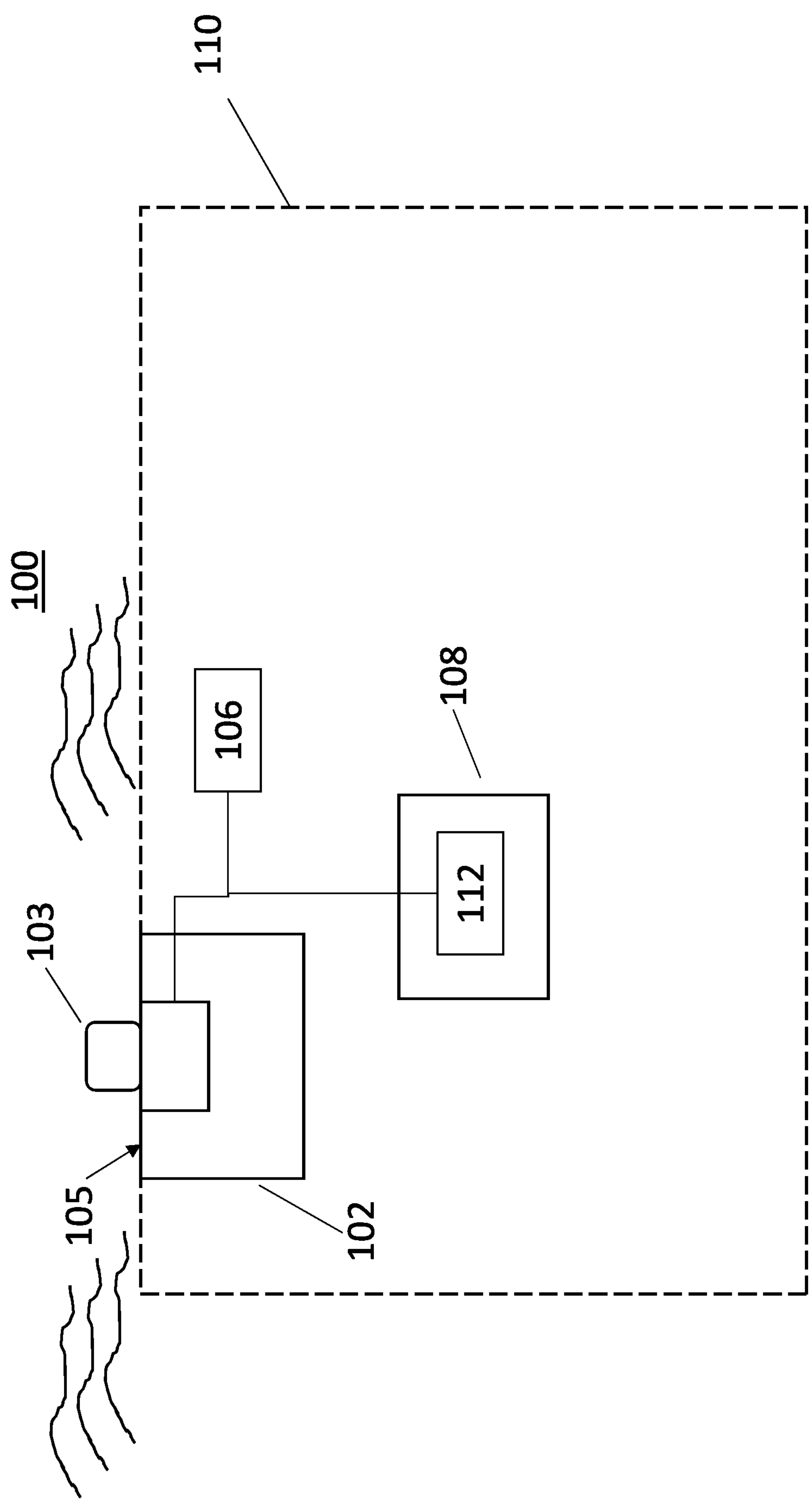
FIG. 1 is a block diagram of an air data system in accordance with the disclosure.

Reference will now be made to the drawings wherein like reference numerals identify similar structural features or aspects of the subject disclosure. For purposes of explanation and illustration, and not limitation, a partial view of an exemplary embodiment of an air data probe monitoring system in accordance with the disclosure is shown in FIG. 1 and is designated generally by reference character 100. Other aspects of the method in accordance with the disclosure, or aspects thereof, are provided in FIG. 2, as will be described. The methods and systems of the disclosure can be used to accurately determine if aircraft probe heaters are providing sufficient power to operate as intended in the specific conditions being flown through at that time.

FIG. 1 shows a system 100 for ensuring proper functionality of a self-compensating heater 103 of an air-data probe 102. The system 100 includes a device 102 having a first surface 105 exposed to airflow about an exterior of an aircraft 110. The device includes a self-compensating heater 103 configured to heat the device, which can be an air-data probe 102 in order to ensure proper measurements are being recorded by the air-data probe 102, and the air-data probe 102 is not being compromised by potential ice buildup. The system 100 further includes power monitoring equipment such as current monitors 106 to measure values representing electrical current flow in and out of air data probe 102 through the self-compensating heater 103. The system 100 also includes a processor 108, and computer-readable memory 112 encoded with instructions that, when executed by the processor 108, cause the processor 108 to receive an air data parameter and atmospheric conditions surrounding the aircraft 110, calculate an expected power demand of the self-compensating heater based on the air data parameters and the atmospheric conditions, and compare the actual power demand of the self-compensating heater 103 to the expected power demand from the air data parameter and atmospheric conditions received by the processor 108. A corrective action is demanded by the system if the actual power demand and the expected power demand differ by more than an acceptable amount.

The air data parameter includes but is not limited to airspeed, total air temperature, altitude, angle of attack, and angle of sideslip. The atmospheric conditions include but are not limited to temperature, ice water content and liquid water content. All of the parameters do not necessarily have to be used to calculate the expected power draw from the self-compensating heater. The expected power draw as a function of the air data parameters and atmospheric conditions can be stored on the computer readable memory 112 prior to the flight and continuously compared to the actual power draw at that time.

The corrective action taken or required by the processor 108 can include changing the power supplied to the self-compensating heater 103 by increasing the power in order to avoid icing over the aircraft probe 102, or decreasing the power supplied in order to prevent overheating and damaging the aircraft probe 102. It is also considered that the corrective action can include removing or servicing the aircraft probe 102 when the aircraft 110 has landed. Corrective action can also include removing the aircraft probe 102 from a voting arrangement that includes at least one other aircraft probe 102, indicating the failure of subject probe, and using only other aircraft probe sensors in order to provide the appropriate data to the aircraft.

Figure 2:
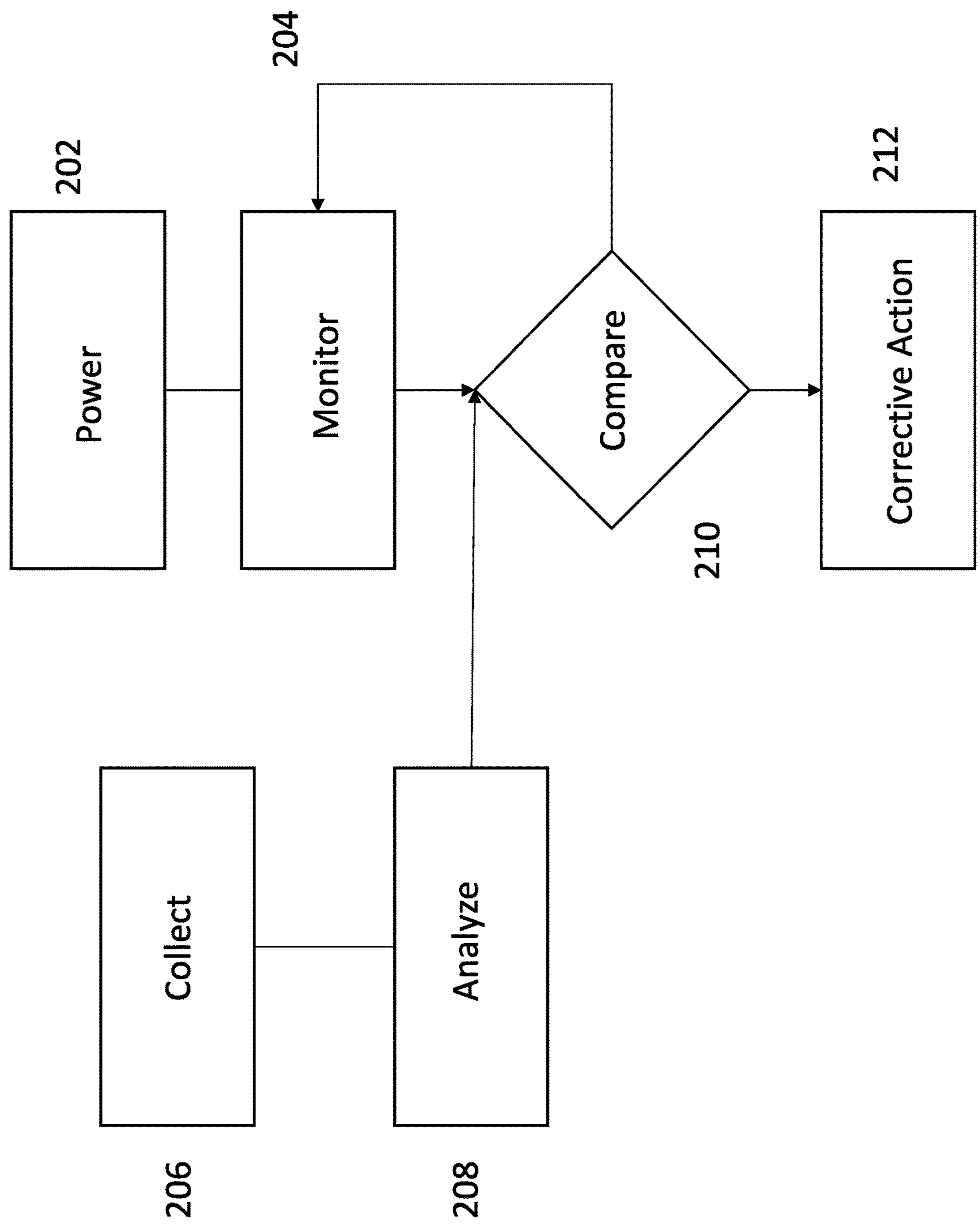
FIG. 2 is a block diagram of a method of using the air data system of FIG. 1 in accordance with the disclosure.

FIG. 2 shows a flow diagram for a method of controlling the system described above. The method includes providing power 202 to an anti-ice system in order to heat the data probe, monitoring 204 an actual power demand of the anti-ice system, and monitoring and collecting 206 an air data parameter and atmospheric conditions surrounding the aircraft and calculating 208 an expected power demand of the anti-ice system given the air data parameters and the atmospheric conditions. Using a processor in order to compare 210 the actual power demand of the anti-ice system to the expected power demand, and performing or signaling to perform 212 a corrective action if the actual power demand and the expected power demand are different by more than an acceptable amount.

The methods and systems of the present disclosure, as described above and shown in the drawings, provide for an icing monitoring system with superior properties including increased reliability. While the apparatus and methods of the subject disclosure have been shown and described with reference to embodiments, those skilled in the art will readily appreciate that changes and/or modifications may be made thereto without departing from the spirit and scope of the subject disclosure.

The invention claimed is:

1. A method comprising:

providing power to an aircraft probe anti-ice system;

monitoring an actual power demand of the aircraft probe anti-ice system;

calculating an expected power demand of the aircraft probe anti-ice system based on air data parameters and the atmospheric conditions;

comparing the actual power demand of the aircraft probe anti-ice system to the expected power demand; and performing a corrective action if the actual power demand and the expected power demand are different by more than a selected amount, wherein the corrective action includes removing an aircraft probe data from a voting arrangement, wherein the voting arrangement includes data from at least one other aircraft data probe.

2. The method of claim 1, further comprising monitoring the air data parameters and atmospheric conditions surrounding the aircraft.

3. The method of claim 2, wherein the air data parameters include airspeed, total air temperature, altitude, angle of attack, and angle of sideslip.

4. The method of claim 2, wherein the atmospheric conditions include temperature, ice water content and liquid water content.

5. The method of claim 2, wherein the anti-ice system includes a self-compensating heater.

6. The method of claim 2, wherein the corrective action includes changing the power supplied to the anti-ice system.

7. The method of claim 6, wherein changing the power supplied to the anti-ice system includes increasing the power supplied.

8. The method of claim 6, wherein changing the power supplied to the anti-ice system includes decreasing the power supplied.

9. The method of claim 2, wherein the corrective action includes removing an aircraft probe.

10. The method of claim 2, wherein the corrective action includes notifying the pilots and/or aircraft systems that the subject aircraft probe data may not be reliable.

11. A system comprising:

a device having a first surface configured to be exposed to airflow about an exterior of an aircraft, the device including a first self-compensating heater configured to heat the first surface;

at least one current monitor configured to produce a first measurement value representing electrical current flow in and out of the first self-compensating heater;

one or more processors; and computer-readable memory encoded with instructions that, when executed by the one or more processors, cause the system to:

receive air data parameters and atmospheric conditions surrounding the aircraft;

calculate an expected power demand of the self-compensating heater based on the air data parameters and the atmospheric conditions;

compare the actual power demand of the self-compensating heater to the expected power demand; and perform a corrective action if the actual power demand and the expected power demand are different by more than an acceptable amount, wherein the corrective action includes removing an aircraft probe data from a voting arrangement, wherein the voting arrangement includes data from at least one other device.

12. The system of claim 11, wherein the device is an air data probe.

* * * * *